(12) United States Patent
Nelgner (10) Patent No.: US 11,745,271 B2
(45) Date of Patent: Sep. 5, 2023

(54) ON-CAR BRAKE LATHE ADJUSTABLE HUB ADAPTER

(71) Applicant: Hunter Engineering Company, Bridgeton, MO (US)

(72) Inventor: William J. Nelgner, St. Charles, MO (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 491 days.

(21) Appl. No.: 16/917,344

(22) Filed: Jun. 30, 2020

(65) Prior Publication Data

US 2021/0001406 A1 Jan. 7, 2021

Related U.S. Application Data

(60) Provisional application No. 62/869,884, filed on Jul. 2, 2019.

(51) Int. Cl.
*B23B 31/12* (2006.01)
*B23B 5/04* (2006.01)

(52) U.S. Cl.
CPC ............ *B23B 31/1261* (2013.01); *B23B 5/04* (2013.01); *B23B 2235/04* (2013.01); *Y10T 82/21* (2015.01)

(58) Field of Classification Search
CPC ......... B23B 5/02; B23B 5/04; B23B 31/1261; B23B 2235/04; Y10T 82/21
See application file for complete search history.

(56) References Cited

U.S. PATENT DOCUMENTS

| 2,883,198 A | * | 4/1959 | Natsuo | B23B 31/1284 279/106 |
| 2,980,434 A | * | 4/1961 | Hoffman | B23B 31/1269 279/106 |
| 6,050,160 A | * | 4/2000 | Newell | B23B 5/04 82/112 |

(Continued)

FOREIGN PATENT DOCUMENTS

EP 0014138 A1 * 8/1980

OTHER PUBLICATIONS

Hunter Engineering Co. Product Literature, "Operation Instructions Model BL300 on-car rotor lathe", Form 3143T, St. Louis, Missouri, Aug. 1995.

*Primary Examiner* — Eric A. Gates
(74) *Attorney, Agent, or Firm* — Sandberg Phoenix & von Gontard PC (57) ABSTRACT

An adjustable hub adapter for coupling an on-car brake lathe to a wheel hub. An annular support frame coaxially carries an axially bored and threaded central mounting hub with a set of equidistantly spaced spokes. A lug bolt receiver is associated with each spoke, and consists of a receiving tube, a lever arm pivotally coupled to the spoke at a pivot bolt in proximity to the annular support frame. An engagement pin on each lever arm is captured within a synchronizing ring carried on the annular support frame. The rotational movement of any lug bolt receiver about an axis of the pivot bolt imparts rotational movement to the synchronizing ring, and in turn, causes each remaining bolt receiver to rotate about an associated pivot bolt axis, maintaining the lug bolt receivers in a synchronized and symmetric radial displacement from the central mounting hub.

19 Claims, 11 Drawing Sheets

(56) References Cited

U.S. PATENT DOCUMENTS

| 7,066,690 | B2 * | 6/2006 | Ebert | B23P 6/00 |
| | | | | 408/102 |
| 7,536,935 | B2 * | 5/2009 | Greenwald | B23B 5/04 |
| | | | | 82/112 |

* cited by examiner

FIGURE 16
PRIOR ART

ON-CAR BRAKE LATHE ADJUSTABLE HUB ADAPTER

CROSS-REFERENCE TO RELATED APPLICATIONS

The present application is related to, and claims priority from U.S. Provisional Patent Application Ser. No. 62/869,884 filed on Jul. 2, 2019, and which is herein incorporated by reference.

STATEMENT REGARDING FEDERALLY SPONSORED RESEARCH

Not Applicable.

BACKGROUND OF THE INVENTION

The present application is related to on-car vehicle brake lathes, and in particular, to an adjustable adapter component for securing a drive spindle of an on-car vehicle brake lathe to a vehicle wheel hub assembly during a brake rotor resurfacing procedure.

A main components of a vehicle wheel disc-style braking system is a brake rotor, which provides a solid rotating surface against which a stationary brake friction pad is clamped or compressed to generate a frictional force, slowing the rotational movement of the brake rotor and the associated vehicle wheel. Brake rotors are subjected to frequent and substantial frictional forces by the brake friction pads, and over time, become worn. Uneven application of braking force, entrapped road debris, or uneven frictional surfaces on the brake friction pads can result in the formation of grooves, channels, or scratches in the surfaces of the brake rotors. Repeated heating and cooling of the brake rotors resulting in extreme temperature variations can additionally result in a lateral warping of the brake rotors.

A damaged or warped brake rotor may be resurfaced by cutting or grinding to provide a uniform smooth brake friction pad contact surface if sufficient brake rotor material remains to provide an adequate braking surface without compromising the structural integrity of the vehicle braking system. However, once a brake rotor has been worn below a minimum safe thickness, it lacks sufficient mass to safely dissipate the heat generated during a brake application, and must be replaced.

To provide for a uniform surface, any abnormalities in the brake rotor, such as a lateral warping, must be removed during the resurfacing procedures. In addition to thermal cycling, over tightened attachment bolts or uneven mounting surface onto which the brake rotor is secured in the vehicle wheel assembly can contribute to lateral warping of the brake rotor. If the brake rotor is removed from the vehicle wheel assembly for a resurfacing operation on a fixed or "bench" brake lathe, any abnormalities or defects resulting from the mounting of the brake rotor to the vehicle wheel assembly may not be accurately identified or corrected during the resurfacing procedure. Accordingly, a variety of brake resurfacing machines or brake lathes have been developed to resurface brake rotors while they remain mounted to the vehicle wheel assembly.

Figure 15:
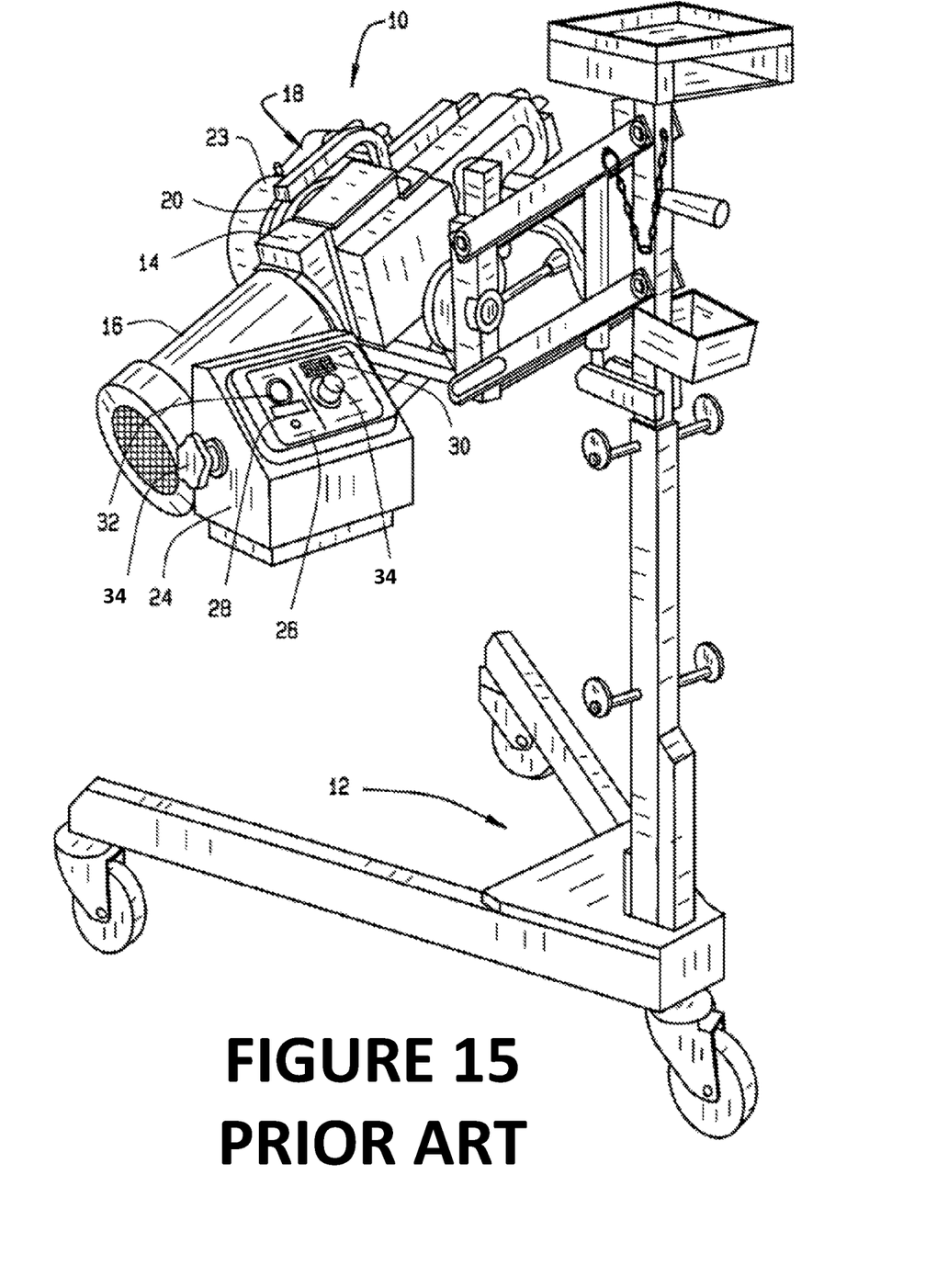
FIG. 15 is a perspective view of a prior art on-car brake lathe and support.

Brake resurfacing machines or brake lathes configured to resurface brake rotors mounted to a vehicle wheel assembly are commonly referred to as on-car brake lathes, such as shown in FIG. 15. Examples of an on-car brake lathe include the OCL-series brake lathes sold by Hunter Engineering Co. of St. Louis, Mo. By eliminating the need to remove the brake rotor from the vehicle wheel assembly, the overall efficiency of the resurfacing procedure is improved, and the chances for operator-induced error are reduced. However, the resurfacing of brake rotors which remain mounted to the vehicle wheel assembly requires that the on-car brake lathe and the vehicle wheel assembly, including the brake rotor, be temporarily coupled together for rotation about a common axis, typically, the rotational axis of the vehicle wheel assembly hub onto which the on-car brake lathe is secured.

Figure 16:
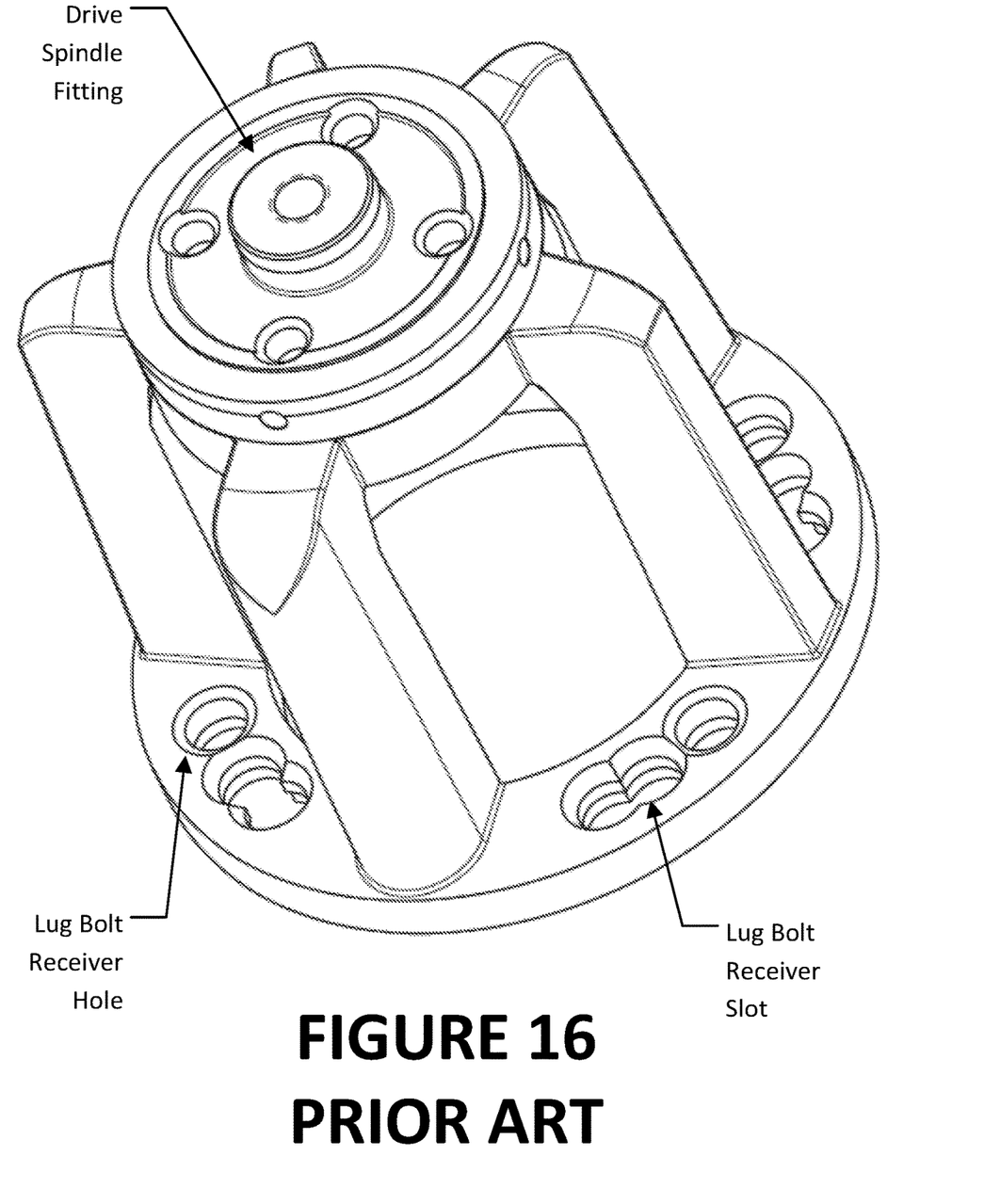
FIG. 16 is a perspective view of a prior art fixed hub adapter.

In order to secure the on-car brake lathe to the vehicle wheel assembly, an adapter is required in order to allow for engagement between the drive spindle and the specific lug bolt pattern of the wheel hub undergoing service. Vehicle wheel hubs have a large variety of lug bolt patterns, varying both in the number of lug bolts and the diameter of the lug bolt circle located about the wheel hub axis of rotation. Additionally, the size of the lug bolts may vary between wheels. Typical on-car brake lathe systems provide a number of fixed adapters, such as shown in FIG. 16, having slots, holes, or channels for receiving wheel hub lug bolts arranged in various configurations at one axial end, and a drive spindle fitting at the opposite axial end. The number of required adapters proliferates rapidly in vehicle service shops providing service for a wide range of vehicles varying in make, model, and age. For brake service specialty shops in particular, the cost to acquire all of the fixed adapters necessary to service the wide range of vehicles can become quite high.

Accordingly, there is a need in the automotive service industry, and in brake service sector in particular, for an adjustable hub adapter capable of operatively coupling an on-car brake lathe to a wide range of vehicle wheel assembly lug patterns, thereby eliminating the need to acquire multiple fixed adapters. It would be further advantageous to provide an adjustable hub adapter which can be readily adjusted to accommodate different wheel lug bolt patterns without requiring specialized tools or measuring devices.

BRIEF SUMMARY OF THE INVENTION

The present disclosure sets forth an adjustable hub adapter for use in coupling an on-car brake lathe to wheel hubs having a variety of different lug bolt configurations. The adjustable hub adapter consists of an annular support frame coaxially carrying an axially bored and threaded central mounting hub by means of a set of equidistantly spaced spokes. A lug bolt receiver is pivotally coupled to each spoke, projecting in an outboard direction, parallel to a central axis of the annular support frame, which passes through the central mounting hub. Each lug bolt receiver consists of a receiving tube, having a tapered opening at an outboard end to receive a wheel hub lug bolt. A second opening into the receiving tube at the inboard end, opposite from the outboard end, is sized to receive a lug nut and associated socket tool. The outboard end of the receiving tube is further coupled to a lever arm, which in turn is pivotally coupled to an associated spoke on a machined boss coaxially surrounding a pivot bolt in proximity to the annular support frame. An engagement pin on each lever arm is captured within a synchronizing ring carried on the annular support frame. For each lug bolt receiver, rotational movement on the machined boss about an axis of the pivot bolt results in an arcuate movement of the receiving tube between radially inward and outward limits, enabling adjustment to match a bolt circle diameter of a wheel hub. The rotational movement of any lug bolt receiver about the pivot bolt axis results in the engagement pin on the lever arm imparting a rotational movement to the synchronizing ring, and in turn, causing each remaining lug bolt receiver to rotate on a corresponding machined boss about an associated pivot bolt axis, maintaining the set of lug bolt receivers in a synchronized and symmetric radial displacement from the central mounting hub.

In a further embodiment, the adjustable hub adapter is configured for use with wheel hubs having three or six lug bolts, and includes a set of three equidistantly spaced spokes and a corresponding set of three lug bolt receivers coupled there to.

In another embodiment, the adjustable hub adapter is configured for use with wheel hubs having four or eight lug bolts, and includes a set of four equidistantly spaced spokes and a corresponding set of four lug bolt receivers coupled there to.

In yet another embodiment, the adjustable hub adapter is configured for use with wheel hubs having five or ten lug bolts, and includes a set of five equidistantly spaced spokes and a corresponding set of five lug bolt receivers coupled there to.

A method of the present invention for coupling an on-car brake lathe to a wheel hub of a vehicle undergoing a brake service employs an adjustable hub adapter interposed between the lathe drive spindle and the wheel hub. Initially, the adjustable hub adapter is selected in accordance with the number of lug bolts present on the wheel hub. Once selected, a set of lug bolt receivers on the adjustable hub adapter are configured to align with three or more of the wheel hub lug bolts by synchronously rotating along a range of arcuate movement between a radially innermost contracted configuration, and a radially outermost expanded configuration. Arcuate movement of any lug bolt receiver is translated into corresponding simultaneous arcuate movement of each remaining lug bolt receiver by rotation of a synchronizing ring operatively linking each lug bolt receiver. Once aligned, the adjustable hub adapter is fitted to the wheel hub by placing the lug bolt receivers over the aligned wheel hub lug bolts, such that the wheel hub lug bolts pass through the tapered openings into the axial bores within the lug bolt receivers. A set of tapered lug nuts are then passed into the axial bores through axial openings opposite the tapered openings, and threaded onto the wheel hub lug bolts within the lug bolt receivers. Engagement of the tapered lug nuts with the conical surfaces of the tapered openings secures the lug bolt receivers in centered engagement on each wheel hub lug bolt. Each lug bolt receiver is secured against further arcuate movement by tightening an associated pivot bolt about which the arcuate movement occurs, fully securing the adjustable hub adapter to the wheel hub in axial alignment with the wheel hub axis of rotation. To complete the coupling, the on-car brake lathe is positioned to bring the lathe drive spindle into axial alignment with a central mounting hub of the adjustable hub adapter, and a threaded retaining rod passed axially through the drive spindle to engage a threaded bore in the central mounting hub. Tightening the threaded retaining rod within the threaded bore securely couples the on-car brake lathe to the adjustable hub adapter, which in turn is secured to the wheel hub.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 13a is a side plan view of a short lug bolt receiver;

FIG. 13b is a cross sectional view of the short lug bolt receiver of FIG. 13a;

FIG. 14b is a cross sectional view of the long lug bold receiver of FIG. 14a;

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Referring to FIG. 15, a basic on-car brake lathe 10 is shown mounted to a transport trolley 12 for positioning adjacent a vehicle to be serviced (not shown). The on-car brake lathe 10 includes a support structure 14, onto which is mounted a spindle motor 16, which may be a variable speed motor, an adjustable cutting head 18, and an output spindle 20. The spindle motor 16 is coupled to the output spindle 20 through a conventional drive mechanism (not shown) contained within the support structure 14, to rotate the output spindle 20 about a drive axis, and to linearly feed the cutting head 18 having spaced apart tool holders and cutting bits through a predetermined cutting range. A removable adapter 23 couples the output spindle 20 to a vehicle wheel hub or brake assembly (not shown). An operator console or electrical enclosure 24 may be provided to support an operator interface 26 and lathe control components such as logic circuits or processing systems. The operator interface 26 may include a variety of interface elements, such as displays 28, 30 and visual display elements 32 configured to provide the operator with information associated with the operation of the on-car brake lathe 10. Operator input controls 34 may be incorporated into the operator interface 26, and may include elements such as, but not limited to, a start button, a stop button, a spindle speed control knob, a compensation button, and a runout test button. Alternative suitable means for providing necessary operator input, such as through a configurable touch-screen or remote interface (not shown) may be utilized.

Figure 1:
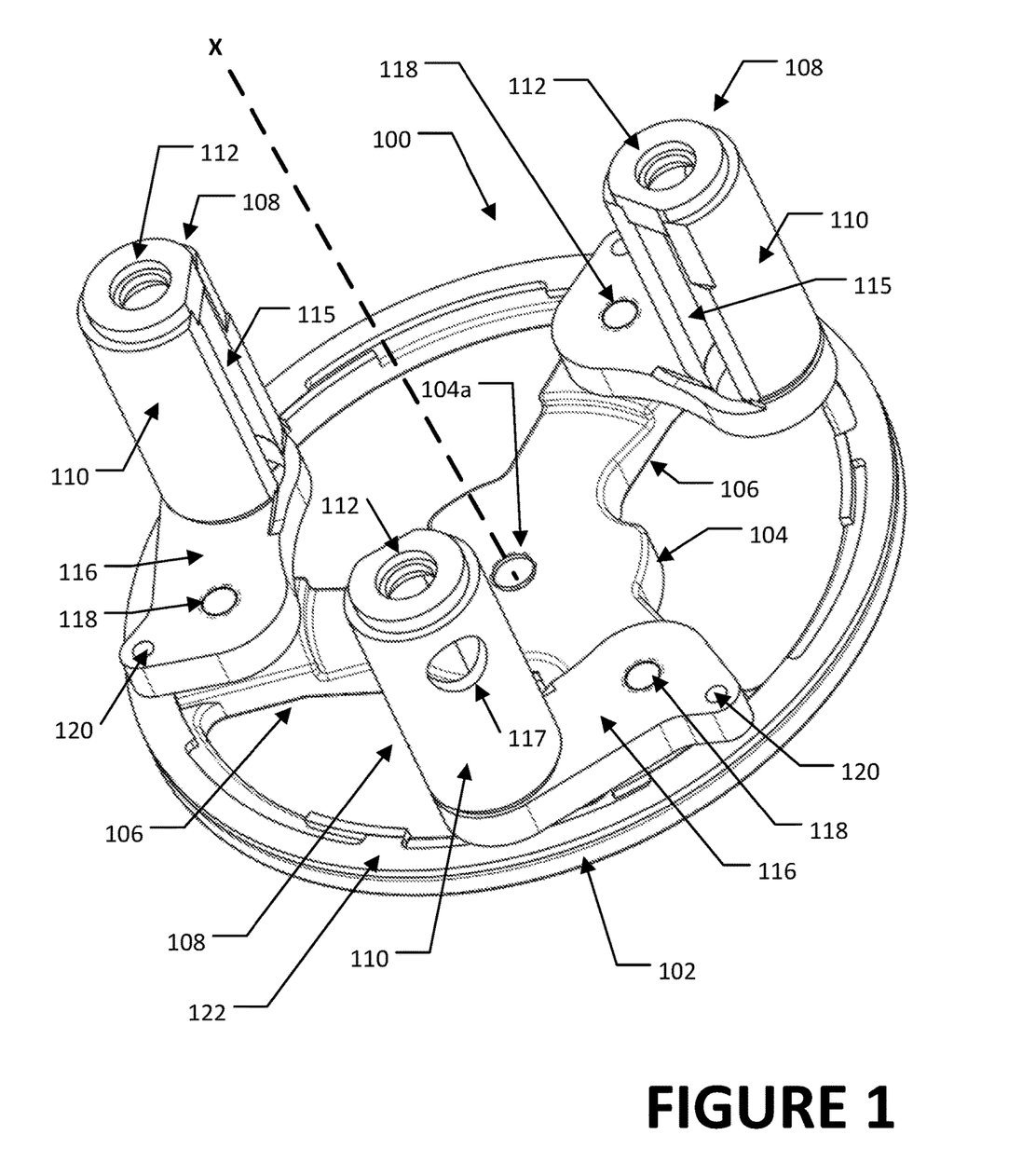
FIG. 1 is a perspective outboard view of a 3-lug adjustable hub adapter of the present disclosure in an expanded configuration.
Figure 2:
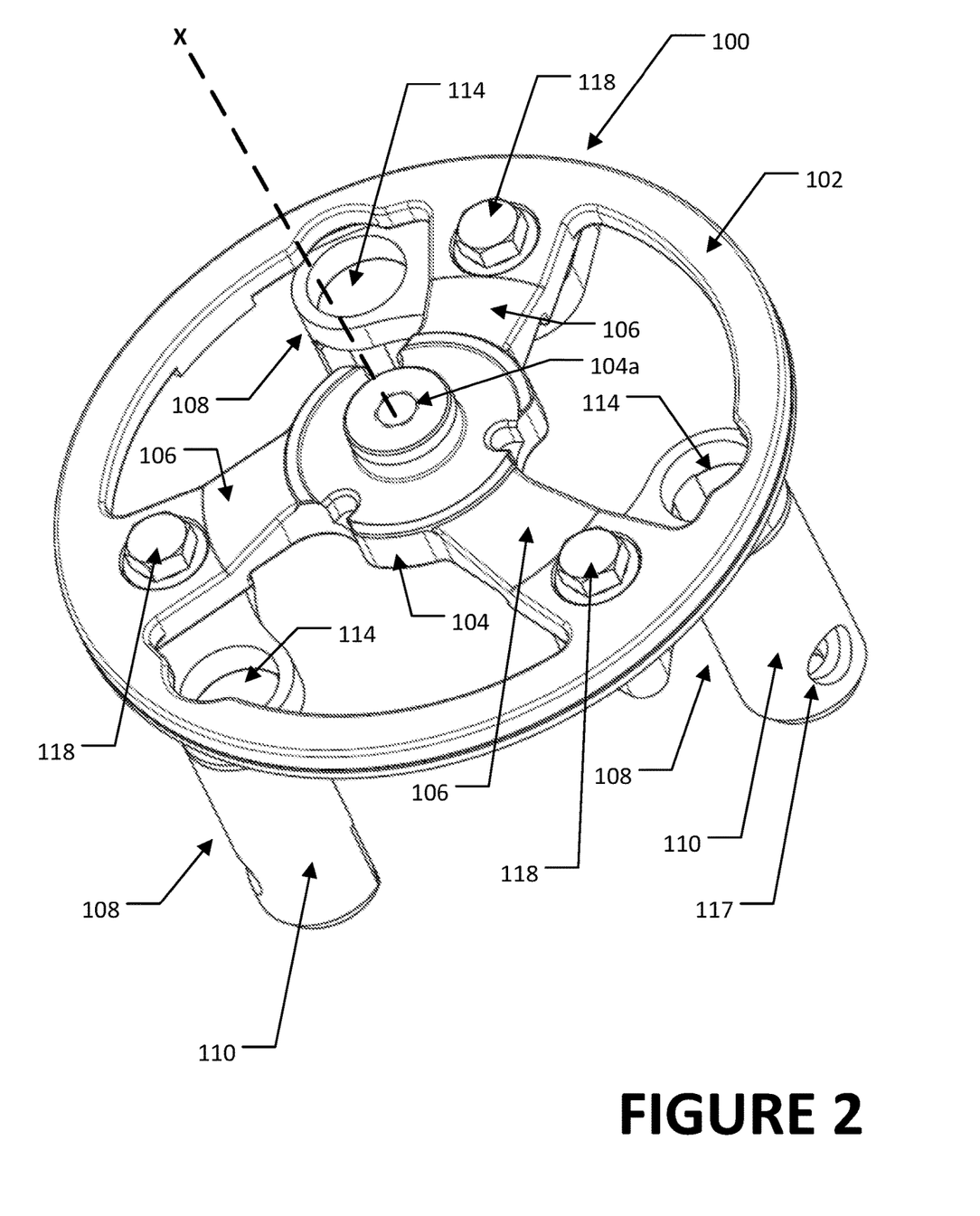
FIG. 2 is a perspective inboard view of the hub adapter shown in FIG. 1.
Figure 3:
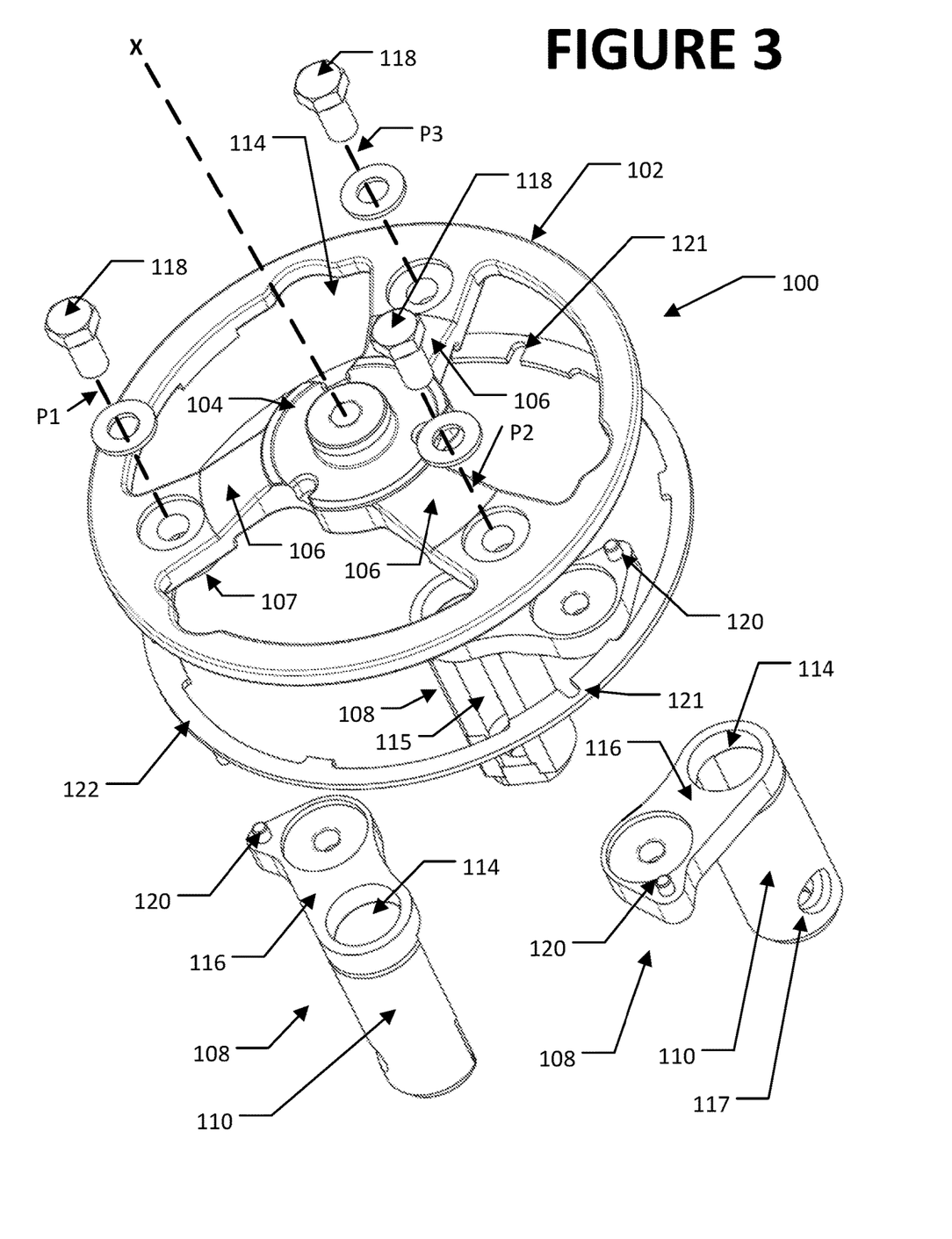
FIG. 3 is an exploded perspective view of the hub adapter of FIG. 2.
Figures 4, 5, 6:
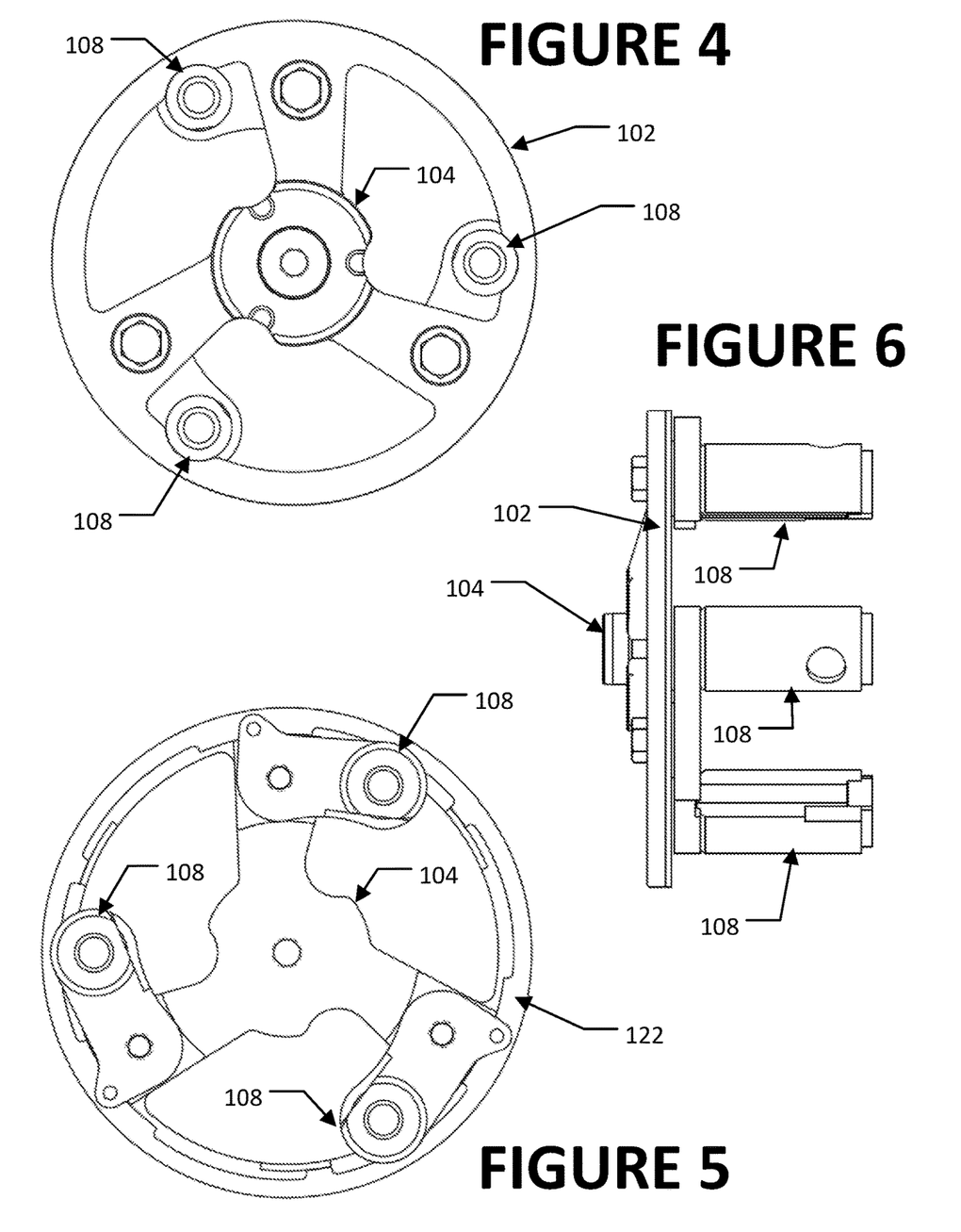
FIG. 4 is an inboard plan view of the hub adapter of FIG. 1.
FIG. 5 is an outboard plan view of the hub adapter of FIG. 1.
FIG. 6 is a side plan view of the hub adapter of FIG. 1.

Turning to FIGS. 1-3, the components of an adjustable hub adapter 100 configured to couple the output or drive spindle 20 of an on-car brake lathe 10 to a vehicle wheel hub or brake assembly are illustrated. The adjustable hub adapter 100 consists of an annular support frame 102 coaxially carrying an axially bored and threaded central mounting hub 104 by means of a set of equidistantly spaced spokes 106. A lug bolt receiver 108 is pivotally coupled to each spoke 106, projecting in an outboard direction parallel to a central axis X of the annular support frame 102 passing through the central mounting hub 104.

Each lug bolt receiver 108 consists of a receiving tube 110, having a tapered opening 112 at an outboard end to receive a lug bolt, and a cylindrical opening 114 at an inboard end to receive a lug nut and associated socket tool. A longitudinal segment may be removed from a portion of the receiving tube 110 outer surface, providing a longitudinal clearance surface towards the central axis X and providing a longitudinal slot 115 for access to the receiving tube central passage 110a. Additional access may be provided by means of a radial opening 117 in proximity to the tapered opening 112 at the axial inboard end. The outboard end of the receiving tube 110 is coupled to a lever arm 116, which in turn is pivotally coupled to a spoke 106 on a machined boss 107 coaxially surrounding a pivot bolt 118, in proximity to the annular support frame 102. An engagement pin 120 on each lever arm 116 is captured within a slot 121 on a synchronizing ring 122 carried on the annular support frame 102. The synchronizing ring 122 is restrained from axial movement by entrapment between an axial face of the annular support frame 102 and a portion of each lever arm 116.

Figure 7:
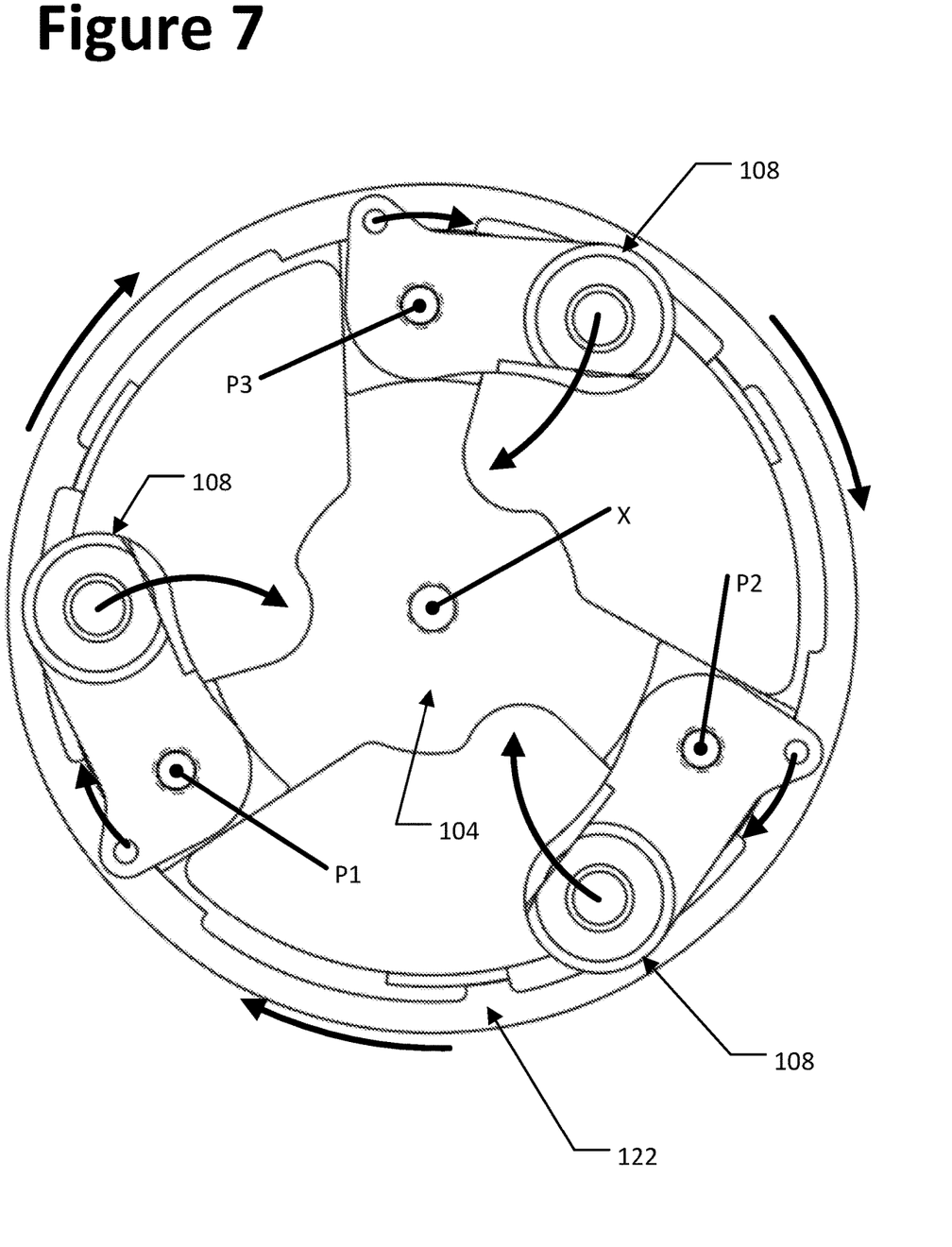
FIG. 7 is an outboard plan view similar to FIG. 5, illustrating rotational movement of the bolt receivers and synchronizing ring from and expanded configuration to a contracted configuration.
Figures 8, 9, 10:
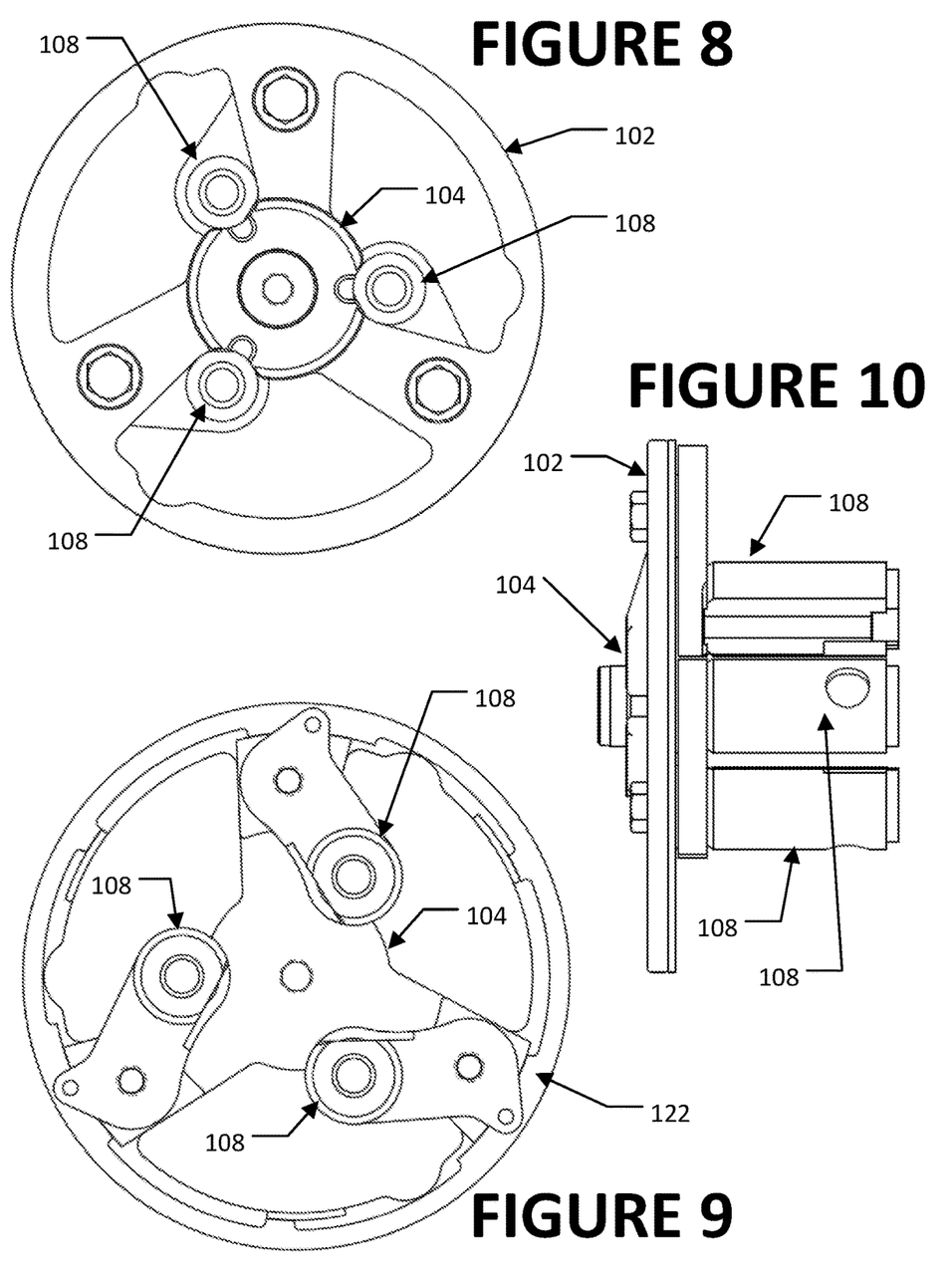
FIG. 8 is an inboard plan view of the hub adapter of FIG. 1, in a contracted configuration following the movement shown in FIG. 7.
FIG. 9 is an outboard plan view of the hub adapter of FIG. 8.
FIG. 10 is a side plan view of the hub adapter of FIG. 8.

For each lug bolt receiver 108, rotational movement on the machined boss 107 about an axis Pn of the associated pivot bolt 118 results in an arcuate movement of the receiving tube 110 between a radially inward and outward limits from the central axis X, permitting adjustment of the lug bolt receiver spacing to match a bolt circle diameter of a wheel hub. Additionally, as illustrated in FIG. 7, the rotational movement of any lug bolt receiver 108 about the axis Pn of the associated pivot bolt 118 results in the engagement pin 120 on the lever arm 116 simultaneously rotating about the axis Pn, imparting a rotational movement about the central axis X to the synchronizing ring 122. Rotational movement of the synchronizing ring 122 in turn causes each remaining lug bolt receiver 108 to rotate on a corresponding machined boss 107 about an associated axis Pn of its respective pivot bolt 118, maintaining a synchronized and symmetric radial displacement of the lug bolt receivers 108 from the central axis X of the central mounting hub 104.

Figure 11:
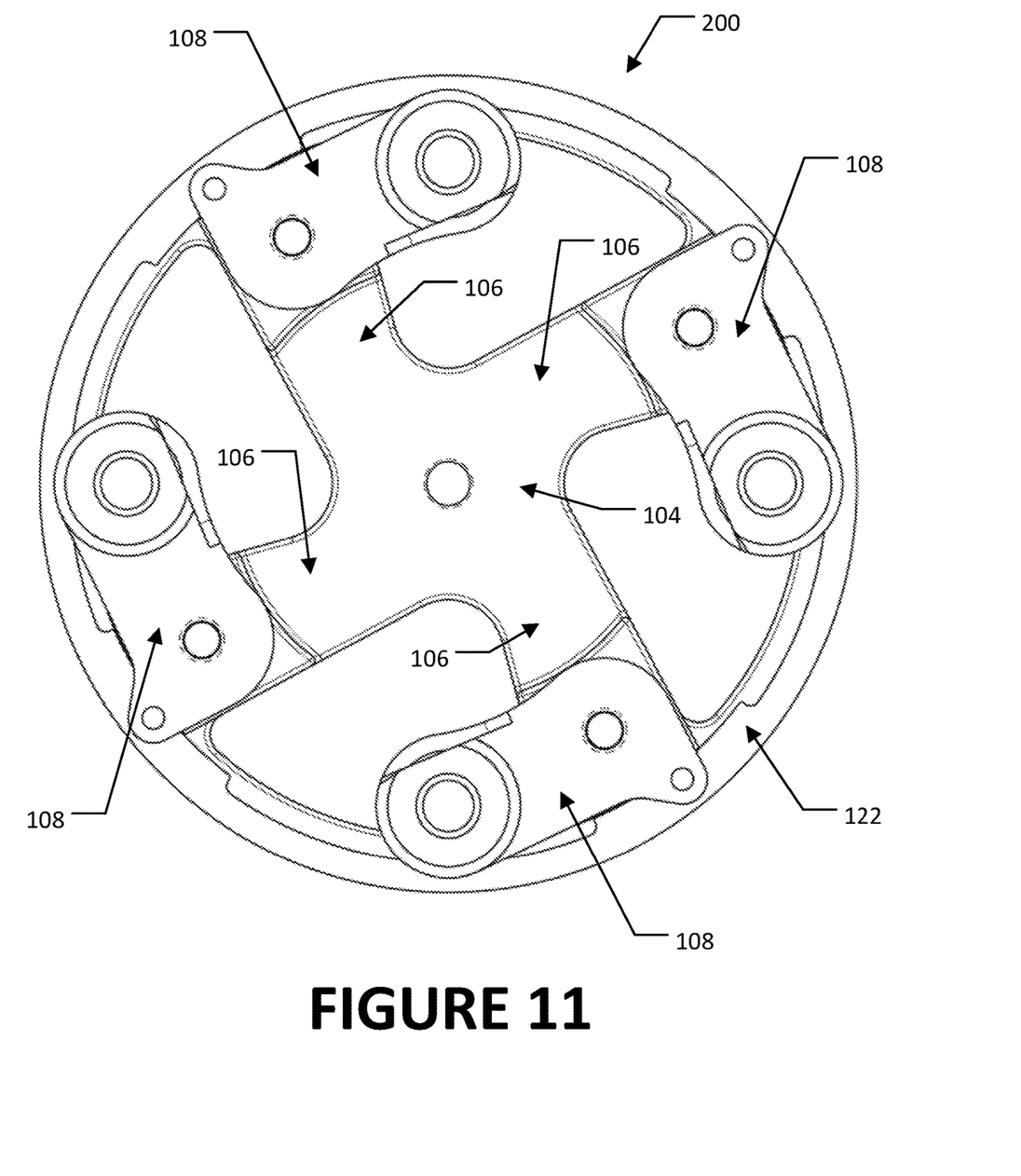
FIG. 11 is an outboard plan view of a 4-lug adjustable hub adapter of the present disclosure in an expanded configuration.
Figure 12:
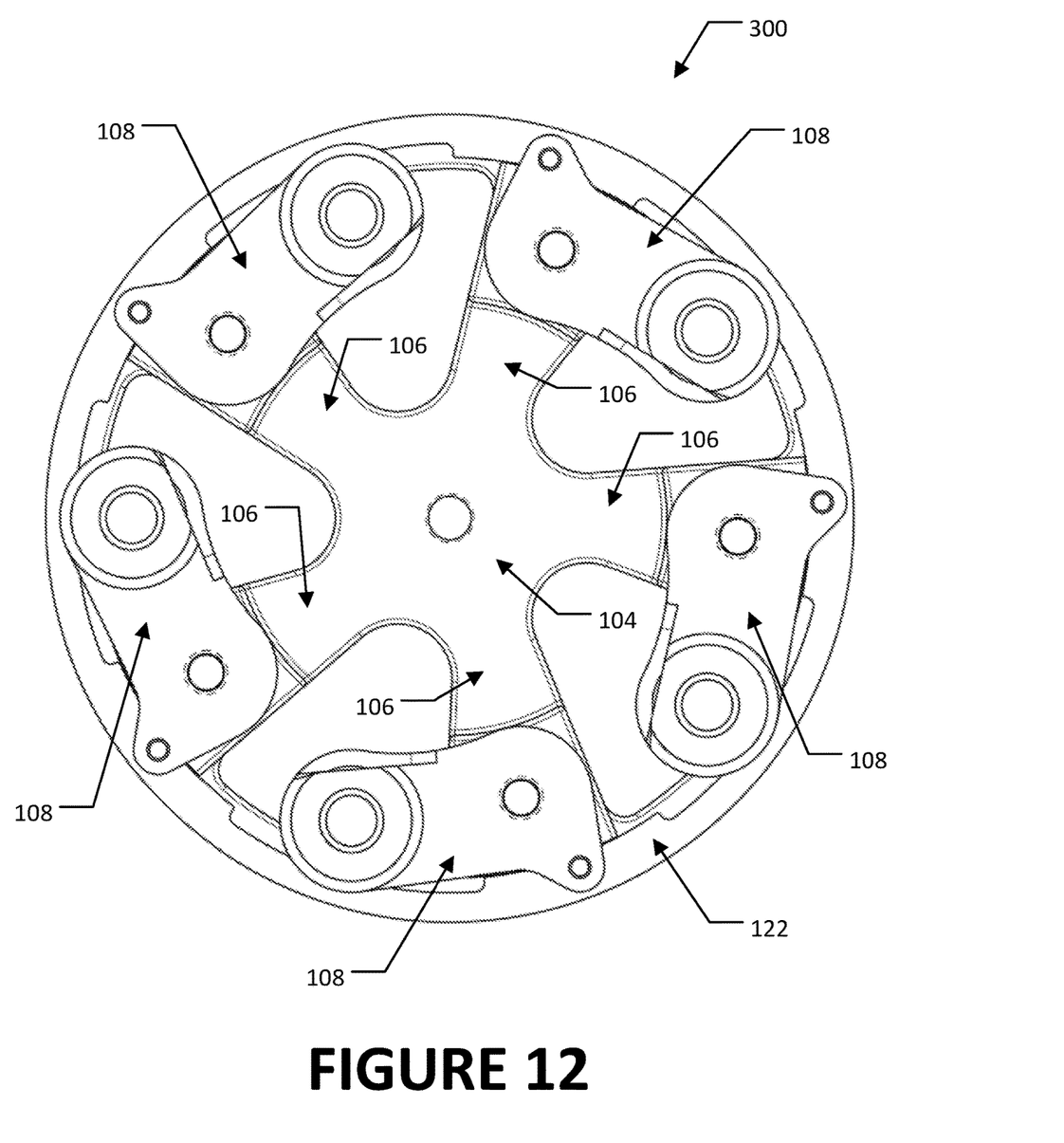
FIG. 12 is an outboard plan view of a 5-lug adjustable hub adapter of the present disclosure in an expanded configuration.

Those of ordinary skill will recognize that the number of lug bolt receivers 108 utilized with the adjustable hub adapter 100 may be increased by modification to the central mounting hub 104, configuration of the spokes 106, and the synchronization ring 122. For example, an adjustable hub adapter 200 is shown in FIG. 11 configured with four lug bolt receivers 108. The use of four lug bolt receivers 108 enables the adjustable hub adapter 200 to be utilized to couple an on-car brake lathe to wheel hub assemblies having four or eight lug bolts. Similarly, an adjustable hub adapter 300 is shown in FIG. 12 configured with five lug bolt receivers 108. The use of five lug bolt receivers 108 enables the adjustable hub adapter 200 to be utilized to couple an on-car brake lathe to wheel hub assemblies having five or ten lug bolts. Accordingly, a set of three differently configured adjustable hub adapters 100, 200, and 300 of the present disclosure may be utilized to facilitate coupling of an on-car brake lathe to a wide variety of wheel hub assemblies having different lug bolt counts and lug bolt circle dimensions.

A method of the present invention for coupling an on-car brake lathe to a wheel hub of a vehicle undergoing a brake service employs an adjustable hub adapter 100, 200, or 300 of the present disclosure interposed between the on-car lathe drive spindle and the wheel hub. Initially, the adjustable hub adapter 100, 200, or 300 is selected in accordance with the number of lug bolts present on the wheel hub. Once selected, a set of lug bolt receivers 108 on the adjustable hub adapter are configured to align with a set of equidistantly spaced wheel hub lug bolts by synchronously moving along an arcuate range of movement between a radially innermost contracted configuration and a radially outermost expanded configuration. Movement of any one lug bolt receiver 108 is translated into corresponding simultaneous movement of each remaining lug bolt receiver 108 by rotation about a central axis X of a synchronizing ring 122 operatively linking each lug bolt receiver 108. To aid in holding the lug bolt receivers 108 in the desired configuration, the engagement between the moving components may be provided with sufficient friction to maintain positioning in the absence of external forces, or one or more lock screws could be provided to temporarily apply a holding force to a moving component.

Once aligned, the adjustable hub adapter 100, 200, or 300 is fitted to the wheel hub by placing the lug bolt receivers 108 over the aligned wheel hub lug bolts, such that the wheel hub lug bolts pass through tapered openings 112 into axial bores 110a within the lug bolt receivers 108. A set of tapered lug nuts are then passed into the axial bores 110a through axial openings 114 opposite the tapered openings 112, and threaded onto the wheel hub lug bolts within the lug bolt receivers 108. Engagement of the tapered lug nuts with the conical surfaces of the tapered openings 112 secures the lug bolt receivers 108 in centered engagement with each wheel hub lug bolt. Each lug bolt receiver 108 is secured against further arcuate movement by tightening the associated pivot bolt 118 about which arcuate movement of the lug bolt receiver 108 occurs, fully securing the adjustable hub adapter 100, 200, or 300 to the wheel hub in substantial axial alignment with the wheel hub axis of rotation.

To complete the coupling, the on-car brake lathe is positioned to bring the lathe drive spindle into axial alignment with a central mounting hub 104 of the adjustable hub adapter, and a threaded retaining rod of the on-car brake lathe passed axially through the drive spindle to engage a threaded bore 104a in the central mounting hub 104. Tightening the threaded retaining rod within the threaded bore 104a securely couples the on-car brake lathe to the adjustable hub adapter 100, 200, 300, which in turn is secured to the wheel hub by the lug bolts within the lug bolt receivers 108. Detachment of the on-car brake lathe from the wheel hub assembly and removal of the adjustable hub adapter at the completion of a brake service procedure is the reverse of the installation process.

Figures 13A, 13B:
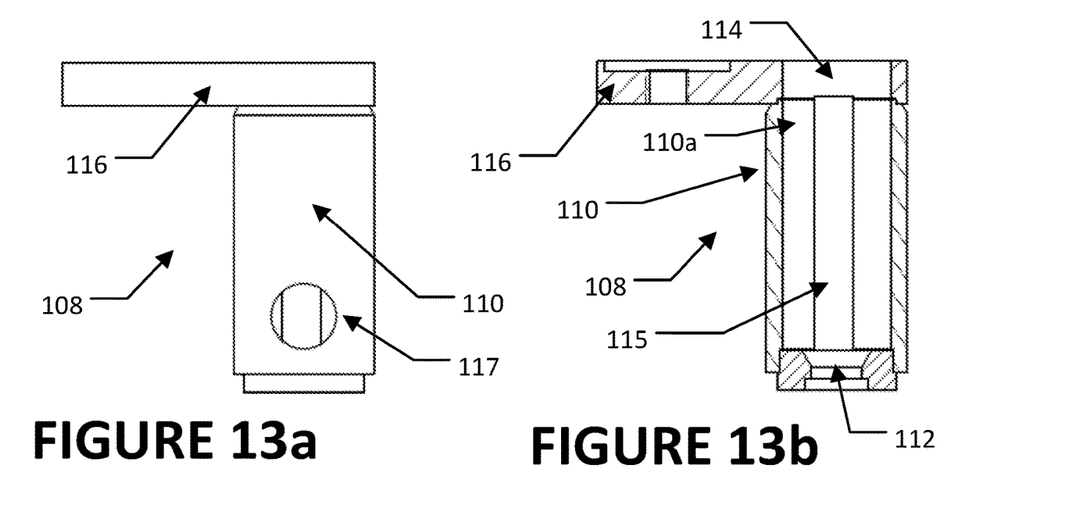
Figure 14A:
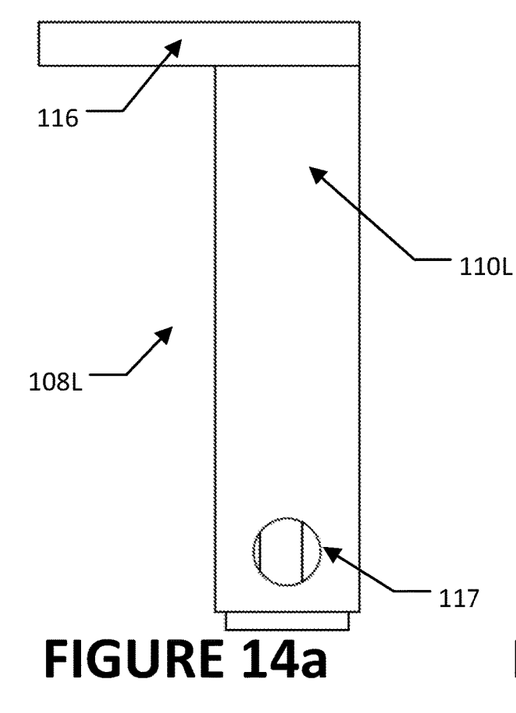
FIG. 14a is a side plan view of a long lug bolt receiver.
Figure 14B:
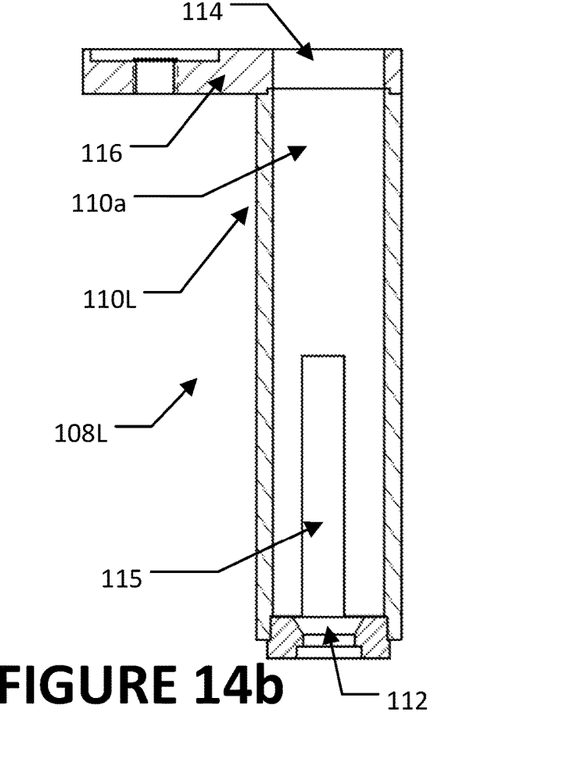

As various changes could be made in the above constructions without departing from the scope of the disclosure, it is intended that all matter contained in the above description or shown in the accompanying drawings shall be interpreted as illustrative and not in a limiting sense. For example, lug bolt receivers 108 may be easily removed from the annular support frame 102 by removal of pivot bolts 118, facilitating switching between lug bolt receivers 108 having short receiving tubes 110, as shown in FIGS. 13 and 13a, and lug bolt receivers 108L having long receiving tubes 110L, as shown in FIGS. 14 and 14a, to accommodate vehicle wheel hubs having different axial offsets.

In an alternate embodiment, the synchronization ring 122 is not included, and the individual lug bolt receivers 108 are able to pivot on the machined boss 107 about the axes of the pivot bolts 118 independently of each other. When securing this alternate embodiment to a vehicle wheel hub, each lug bolt receiver 108 is aligned with a corresponding equidistantly spaced lug bolt manually and independently, before being secured to the wheel hub by the lug bolts.

The invention claimed is:

1. An adjustable hub adapter for coupling an on-car brake lathe to a vehicle wheel hub assembly, comprising:
   an annular support frame, said annular support frame defining an inboard axial direction and an outboard axial direction;
   a central mounting hub coaxially supported within the annular support frame about a central axis by a plurality of equidistantly spaced spokes;
   each spoke including an associated lug bolt receiver pivotally coupled thereto by an associated pivotal coupling, each lug bolt receiver including a receiving tube extending in said outboard axial direction, offset from said associated pivotal coupling; and
   a synchronization ring carried by said annular support frame, said synchronization ring engaged with each lug bolt receiver to maintain each receiving tube at a common radial displacement from said central axis during rotational movement of each lug bolt receiver about said associated pivotal coupling.

2. The adjustable hub adapter of claim 1 wherein each receiving tube includes an axial bore having a tapered axial hole at an outboard end configured to receive a wheel hub lug bolt; and
   an axial opening at an inboard end configured to receive a lug nut and socket.

3. The adjustable hub adapter of claim 1 wherein each lug bolt receiver includes a lever arm extending between said associated pivotal coupling to said spoke and said receiving tube.

4. The adjustable hub adapter of claim 1 wherein each lug bolt receiver associated pivotal coupling is coupled to a machined boss on said associated spoke by a removable pivot bolt.

5. The adjustable hub adapter of claim 1 including either
   a) three equidistantly spaced spokes coaxially supporting said central mounting hub;
   b) four equidistantly spaced spokes coaxially supporting said central mounting hub; or
   c) five equidistantly spaced spokes coaxially supporting said central mounting hub.

6. The adjustable hub adapter of claim 1 wherein rotational movement of said synchronization ring varies said common radial displacement of said receiving tubes from said central axis between a radially-inward contracted configuration, and a radially-outward expanded configuration.

7. The adjustable hub adapter of claim 1 wherein said common radial displacement of said receiving tubes from said central axis corresponds to a wheel hub lug bolt circle.

8. A method for coupling an on-car brake lathe having a drive spindle to a vehicle wheel hub assembly, comprising:
   identifying, on said vehicle wheel hub assembly, a count of lug bolts;
   selecting an adjustable hub adapter of claim 1 having a number of lug bolt receivers corresponding to either said count of lug bolts, or to one-half of said count of lug bolts;
   simultaneously adjusting a position of each of said lug bolt receivers within said adjustable hub adapter to align receiving tubes of said lug bolt receivers with a bolt circle defined by an equidistantly spaced plurality of said lug bolts on said vehicle wheel hub;
   seating said lug bolt receivers onto said corresponding plurality of lug bolts on said vehicle wheel hub assembly, coaxial with a wheel assembly axis of rotation;
   tightening at least one lug nut onto a corresponding lug bolt within said lug bolt receivers, securing said lug bolt receivers to said vehicle wheel hub assembly;
   securing said adjustable hub adapter against changes in said position of said lug bolt receivers;
   coaxially seating said on-car brake lathe drive spindle against a mounting hub surface of said adjustable hub adapter; and
   securing said on-car brake lathe drive spindle to said adjustable hub adapter, whereby an output rotational axis of said drive spindle, is coaxial with a central axis of said adjustable hub adapter and said wheel assembly axis of rotation.

9. The method of claim 8, wherein simultaneously adjusting said position of each of said lug bolt receivers includes rotating a synchronization ring about said central axis of said adjustable hub adapter, said synchronization ring coupled to each of said lug bolt receivers.

10. The method of claim 8 wherein adjusting said position of each of said lug bolt receivers includes pivoting each of said lug bolt receivers about an associated pivot coupling radially displaced from said central axis.

11. The method of claim 8 wherein seating said lug bolt receivers onto said corresponding lug bolts includes passing said lug bolts through outboard axial end openings in each of said associated receiving tubes; and
   wherein tightening said set of lug nuts onto said corresponding lug bolts includes passing said lug nuts through inboard axial end openings in each of said associated receiving tubes to engage said corresponding lug bolts within said receiving tubes.

12. The method of claim 11 wherein tightening said set of lug nuts engages a tapered surface of said associated receiving tubes to axially center each of said corresponding lug bolts within said associated receiving tubes.

13. An adjustable hub adapter for coupling an on-car brake lathe to a vehicle wheel hub assembly, comprising:
   an annular support frame, said annular support frame defining an inboard axial direction and an outboard axial direction;

a central mounting hub coaxially supported within the annular support frame about a central axis by a plurality of equidistantly spaced spokes;

each spoke including an associated lug bolt receiver pivotally coupled thereto by an associated pivotal coupling, each lug bolt receiver including a receiving tube extending in said outboard axial direction, offset from said associated pivotal coupling;

a synchronization ring carried by said annular support frame, said synchronization ring engaged with each lug bolt receiver to maintain each receiving tube at a common radial displacement from said central axis during rotational movement of each lug bolt receiver about said associated pivotal coupling; and wherein each lug bolt receiver includes an engagement pin radially offset from said associated pivotal pivot coupling, said engagement pin operatively coupled to said synchronization ring.

14. The adjustable hub adapter of claim 13 wherein each receiving tube includes an axial bore having a tapered axial hole at an outboard end configured to receive a wheel hub lug bolt;

wherein each receiving tube includes an axial opening at an inboard end configured to receive a lug nut and socket; and wherein each receiving tube includes a longitudinal clearance surface in proximity to a longitudinal slot opening to said axial bore.

15. The adjustable hub adapter of claim 14 wherein each receiving tube include a radial opening opposite said longitudinal slot, in proximity to said tapered axial hole.

16. The adjustable hub adapter of claim 13 wherein said synchronization ring is secured against axial movement by entrapment between each lug bolt receiver and said annular support frame, and has a range of rotational movement about said central axis.

17. The adjustable hub adapter of claim 16 wherein each lug bolt receiver includes an engagement pin offset from said associated pivotal coupling; and wherein each of said engagement pins is engaged with said synchronization ring at an associated connection configured for simultaneous rotational movement about said associated pivotal pivot coupling and said central axis.

18. The adjustable hub adapter of claim 13 wherein said central mounting hub includes a threaded axial bore.

19. The adjustable hub adapter of claim 18 wherein said central mounting hub has an inboard surface configured for engagement with a drive spindle of said on-car brake lathe.

* * * * *

UNITED STATES PATENT AND TRADEMARK OFFICE
CERTIFICATE OF CORRECTION

PATENT NO. : 11,745,271 B2
APPLICATION NO. : 16/917344
DATED : September 5, 2023
INVENTOR(S) : William J. Nelgner It is certified that error appears in the above-identified patent and that said Letters Patent is hereby corrected as shown below:

In the Claims

Claim 13 - Column 9, Line 16, delete "pivot" after "said associated pivotal"
Claim 17 - Column 10, Line 18, delete "pivot" after "said associated pivotal"

Signed and Sealed this
Thirtieth Day of January, 2024

Katherine Kelly Vidal
*Director of the United States Patent and Trademark Office*